E. H. ANGIER.
BALING.
APPLICATION FILED JUNE 6, 1918.
1,311,367. Patented July 29, 1919.
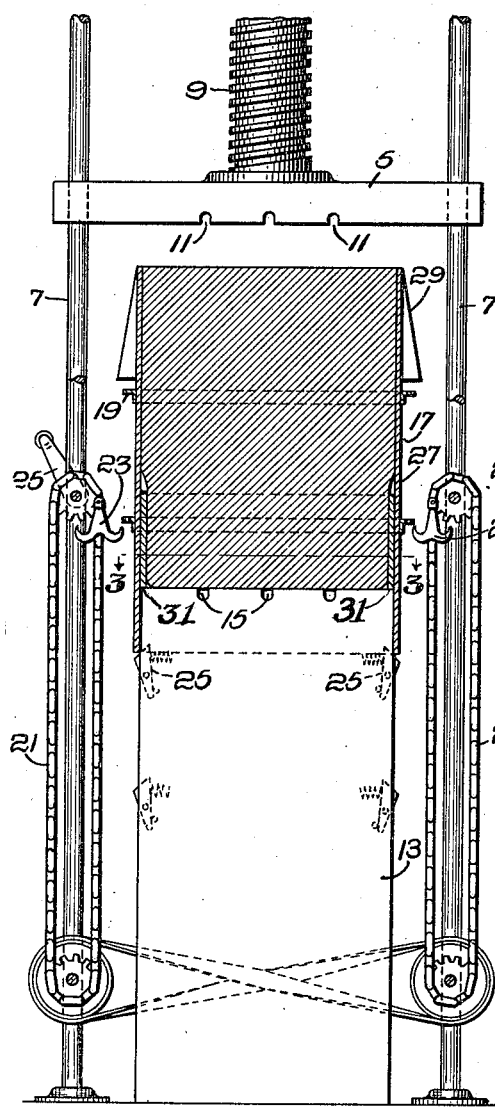
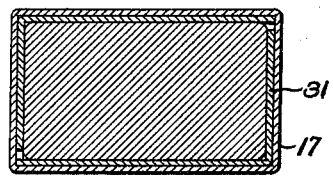
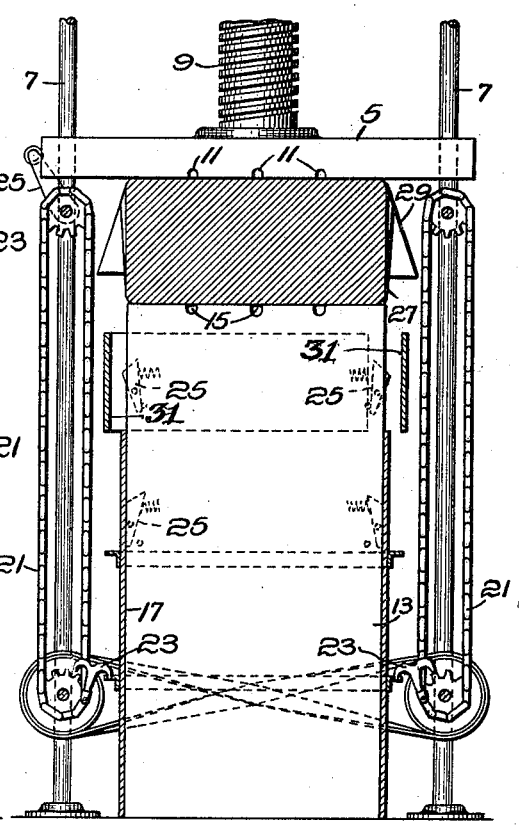
Inventor:
Edward H. Angier,
by Emery, Booth, Janney + Varney.
Attys.

UNITED STATES PATENT OFFICE.

EDWARD H. ANGIER, OF FRAMINGHAM, MASSACHUSETTS.

BALING.

1,311,367.   Specification of Letters Patent.   Patented July 29, 1919.

Application filed June 6, 1918. Serial No. 238,425.

*To all whom it may concern:*

Be it known that I, EDWARD H. ANGIER, a citizen of the United States, and resident of Framingham, in the county of Middlesex and State of Massachusetts, have invented an Improvement in Balings, of which the following description, in connection with the accompanying drawings, is a specification, like characters on the drawings representing like parts.

This invention relates to a baling press and to a method of packaging commodities which may be practised by its aid.

My invention more particularly contemplates the provision of a suitable course of procedure and a suitable mechanism whereby materials may be packaged in sheet-like inclosing coverings.

My invention will best be understood by reference to the following description of the baling press disclosed in the accompanying drawings as an illustrative embodiment of my invention. In these drawings:—

Figure 1 is a view, partly in section and partly broken away, of the baling mechanism prior to the compressing operation;

Fig. 2 is a similar view after compression has been effected; and

Fig. 3 is a section on the line 3—3 of Fig. 1.

Referring to the drawings, the illustrative press there shown embodies a ram 5 guided on the uprights 7 and adapted to be operated in any suitable manner, herein indicated diagrammatically by the representation of a screw 9. The ram has the usual recesses 11 to facilitate the introduction of bale ties.

Opposing the ram is a platform 13 against which the ram is adapted to compress the commodity to be baled. The upper surface of the platform is provided with recesses 15 opposing the recesses 11. Coöperating with the platform and adapted to telescope over the same is a form 17 which is tubular and may be, as shown in Fig. 3, without joint. The form 17 here shown is reinforced with angle irons 19.

It will be noted by referring to Fig. 1 that if the form 17 is in the elevated position shown and the ram descends, it will force the form downwardly, telescoping the same with the platform and compressing any material within the form between the top of the platform and the ram. The height of the platform 13 is greater than that of the form 17, so that the latter can be drawn downwardly over the same as illustrated in Fig. 2, thereby exposing the sides of the material compressed between the platform and the ram, as shown in that figure.

Any suitable means may be provided for manipulating the form apart from the ram 5. I have herein shown at the sides of the platform chains 21 carrying double billed hooks 23 adapted to be engaged with the form, for example as herein shown with the reinforcing angles 19, thereby to draw the form upwardly or downwardly when the chains are driven, as for example by the hand crank 25 shown at the left hand in the figures. Thus, in Fig. 2 it may be supposed that the hooks have been engaged with the lower reinforcing angle of the form after compression has been effected and the chains driven to draw the form down to the position shown. If it is desired to elevate the form, the other bills of the hooks are swung into engagement with the reinforcing angles and the chains are driven in the opposite direction.

For holding the form in adjusted position relative to the platform, spring-pressed latches 25 may be provided having sloping surfaces adapted to engage the lower edge of the form. These serve to support the weight of the form itself, but when the ram is lowered, the pressure acting on the sloping surfaces will serve to swing the latches inwardly against the force of the springs to the position shown at the lower portion of Fig. 2 and permit the form to descend past them. I have herein shown two sets of these latches so that the form may be temporarily supported in a partially raised position to facilitate the preliminary filling of the same.

The press as herein described is particularly adaptable for baling material when it is desired to have the finished bale in its compressed condition surrounded by a wrapping of paper or with a covering in the nature of a box. In the ordinary press wherein a ram descends within a form, it is customary to place a sheet of paper in the bottom of the form and then to fold back the edges of a sheet and place it on the top of the material in the form, to be pressed down therein by the plunger. After the form is removed, as by separating the parts thereof and removing them laterally, it is attempted to unfold this paper but since the edges are either held by the ram of the press or are bent over the same in the opposite direction to that which they should take in the completed package, folding them over in the desired direction frequently results in tearing the same. A press of that kind, furthermore, is totally unadapted for use with coverings which have in the beginning a more or less determined cup-like form.

In accordance with my invention I place on the top of the platform 13, within the form 17, a cup-like covering 27 which may be a sheet of paper folded to the form of the bale and pile therein the commodities desired. Over the top of the form is then placed another cup-like covering 29 which may be either a sheet of paper with the edges folded or a permanent structure similar to a half a cardboard box. This covering fits cap-like over the top of the form. The ram of the press is then lowered, displacing the form 17 and compressing the material to the dimensions shown in Fig. 2. The form 17 is then further withdrawn downwardly, longitudinally in the direction of pressure, from beneath the flanges of the covering 29, and the baled material is then exposed with the flanges or folded portions of the coverings 27 and 29 extending in the directions which they are to take in the completed bale. These coverings may then be joined in any desired manner, as for example by inserting bale ties through the recesses 11 and 15.

To prevent the descending form from drawing up and wrinkling the upwardly extending portions of the covering 27, I may provide a lining for the form, herein (see Fig. 3) shown as comprising two angle plates 31 which support the upwardly turned portions of the covering 27 and rest on the top of the platform. These take the friction of the descending form 17 and it will be understood that they are of a height not greater than the thickness of the desired bale. After the form 17 has been withdrawn to the position shown in Fig. 2, these members 31 may be slipped over the edge of the platform and down over the same, thus exposing the sides of the completed bale. The slight lateral movement necessary to slip them over the edges of the platform is not interfered with by the infolded ends or flanges of the covering 29, and if the two coverings are fairly stiff and formed to shape, in which case there would be less freedom of movement to withdraw such a temporary lining, the liner may be dispensed with as the upwardly extending portions of the covering 27 will then have sufficient stiffness to withstand in themselves the friction of the descending form 17 without drawing up or rumpling.

Referring to Fig. 2, it will be noted that since the ram 5 does not enter the form 17 but displaces the same, it may be guided throughout its travel by the uprights 7 which support the same substantially at the active face thereof. Very little strain is therefore placed upon the lowering mechanism such as the screw 9.

Having thus described the illustrative embodiment of my invention shown in the accompanying drawings, the principles illustrated thereby which I claim as new and desire to secure by Letters Patent I shall express in the following claims:—

1. A baling press comprising a platform, a form telescoping therewith, yieldable means for holding the form in elevated position and a ram opposing the platform and adapted to engage the form.

2. A baling press comprising a platform, a form telescoping therewith, a relatively short liner for the form constructed for removal from the platform when the form is retracted from the same and a ram opposing the platform and adapted to engage the form.

3. A baling press comprising a platform, a form telescoping therewith, a relatively short liner for the form comprising a pair of angle plates each corresponding to two sides of the form and a ram opposing the platform and adapted to engage the form.

4. A baling press comprising a platform adapted to receive a tubular form, uprights adjacent the same, a ram having a face larger than the platform whereby to engage such a form and slidable on said uprights whereby the ram will be supported throughout its descent substantially directly at the face thereof.

5. A method of packaging material characterized by the following steps:—placing a cupped covering member in a form, piling material therein, placing another member cap-like over the end of the form, pressing the members together, withdrawing the form longitudinally in the direction of pressure and joining said members.

6. A method of baling characterized by the following steps:—placing a cupped covering member of flexible material in a form with stiff sheets of less height than the proposed bale laterally interposed between said member and the form, piling material therein, placing another covering member cap-like over the form, pressing the first member together with the stiff sheets and the second member toward one another, withdrawing the form and said sheets longitudinally in the direction of pressure and joining said members.

In testimony whereof, I have signed my name to this specification.

EDWARD H. ANGIER.